Figure 1:
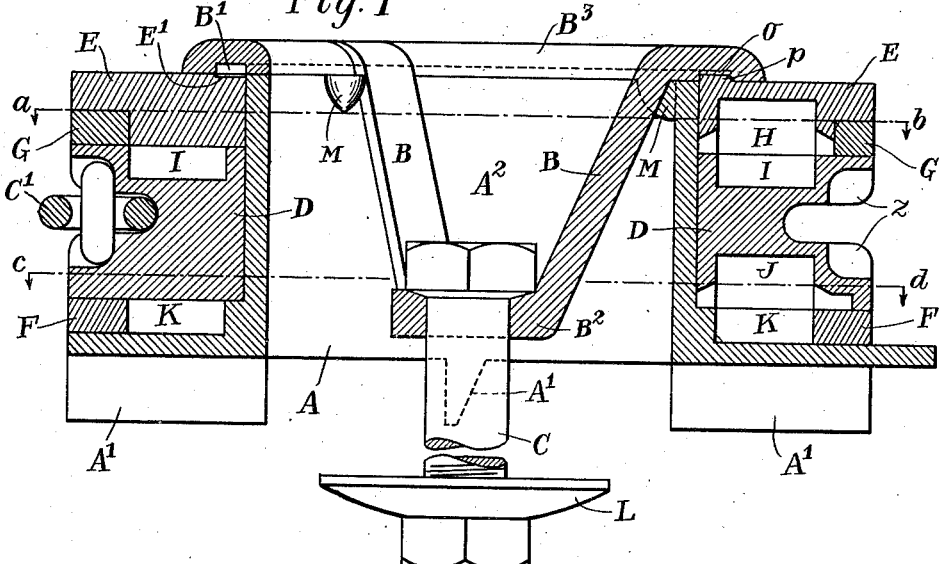

C. ANDRADE, Jr.
PAWL AND RATCHET MECHANISM.
APPLICATION FILED JUNE 23, 1910.

1,016,537.

Patented Feb. 6, 1912.

5 SHEETS—SHEET 1.

WITNESSES:
David J. Halsh
Louis Huck

INVENTOR
Cipriano Andrade Jr

C. ANDRADE, Jr.
PAWL AND RATCHET MECHANISM.
APPLICATION FILED JUNE 23, 1910.
1,016,537.
Patented Feb. 6, 1912.
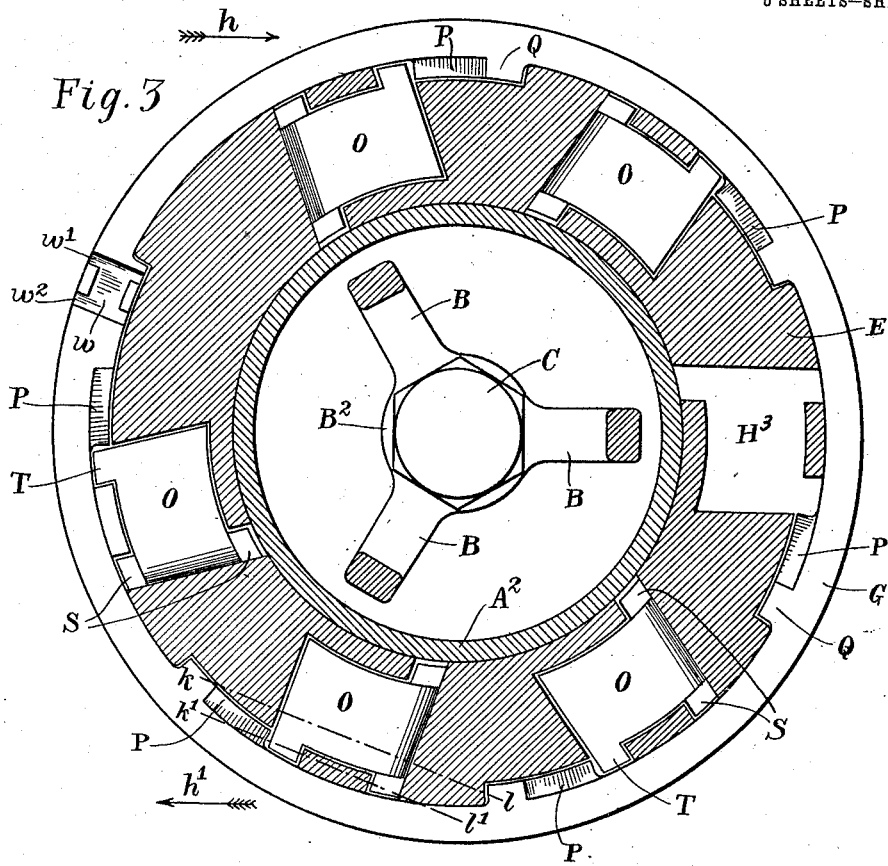
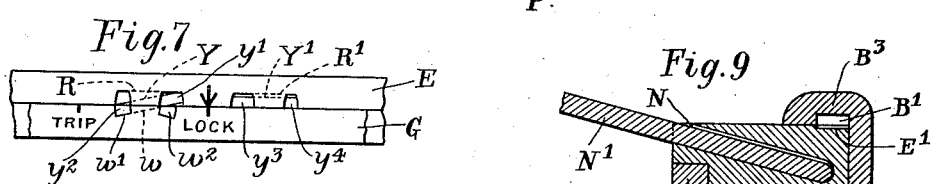
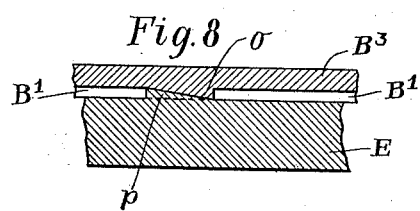
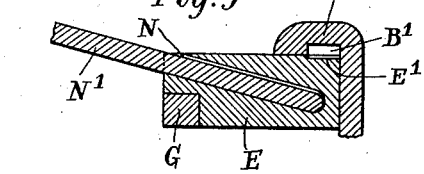
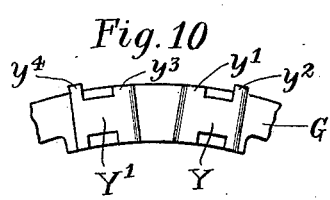
WITNESSES:
David J. Halsh
Louis Huck
INVENTOR
Cipriano Andrade Jr C. ANDRADE, Jr.
PAWL AND RATCHET MECHANISM.
APPLICATION FILED JUNE 23, 1910.
1,016,537.
Patented Feb. 6, 1912.
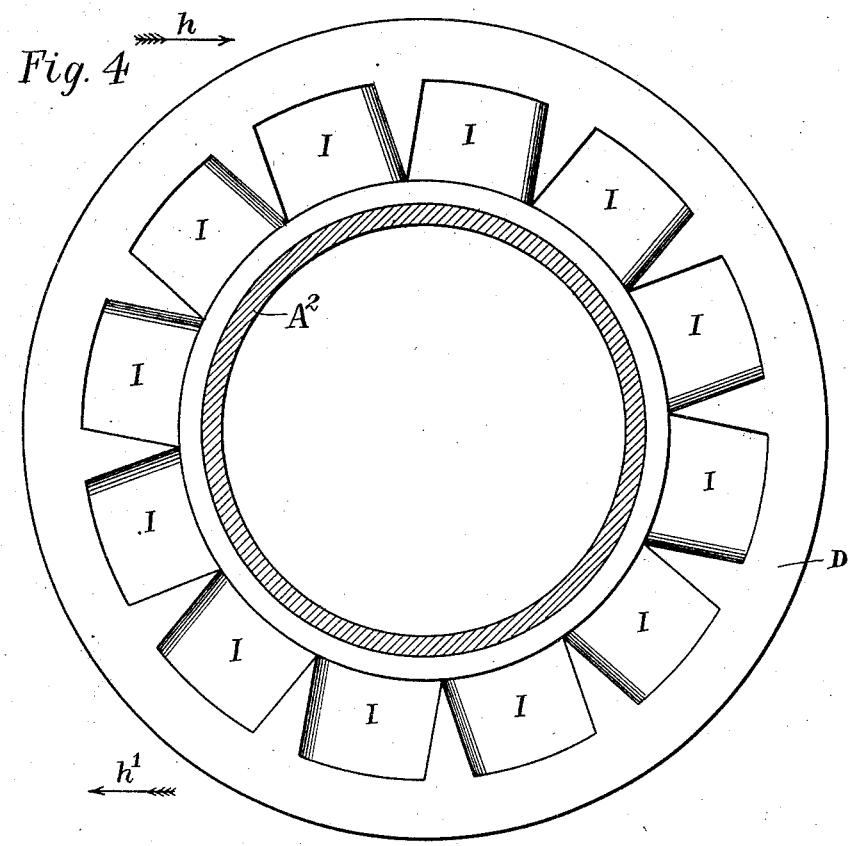
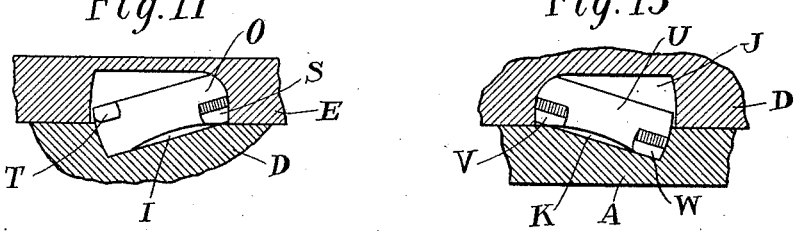
WITNESSES:
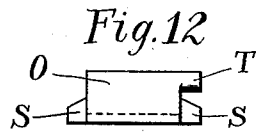
INVENTOR
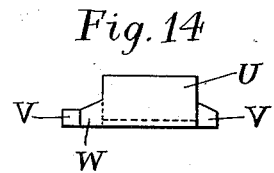

C. ANDRADE, Jr.
PAWL AND RATCHET MECHANISM.
APPLICATION FILED JUNE 23, 1910.

1,016,537.

Patented Feb. 6, 1912.
5 SHEETS—SHEET 4.

WITNESSES:
David J. Walsh
Louis Kuck

INVENTOR
Cipriano Andrade Jr.

C. ANDRADE, Jr.
PAWL AND RATCHET MECHANISM.
APPLICATION FILED JUNE 23, 1910.
1,016,537.
Patented Feb. 6, 1912.
5 SHEETS—SHEET 5.
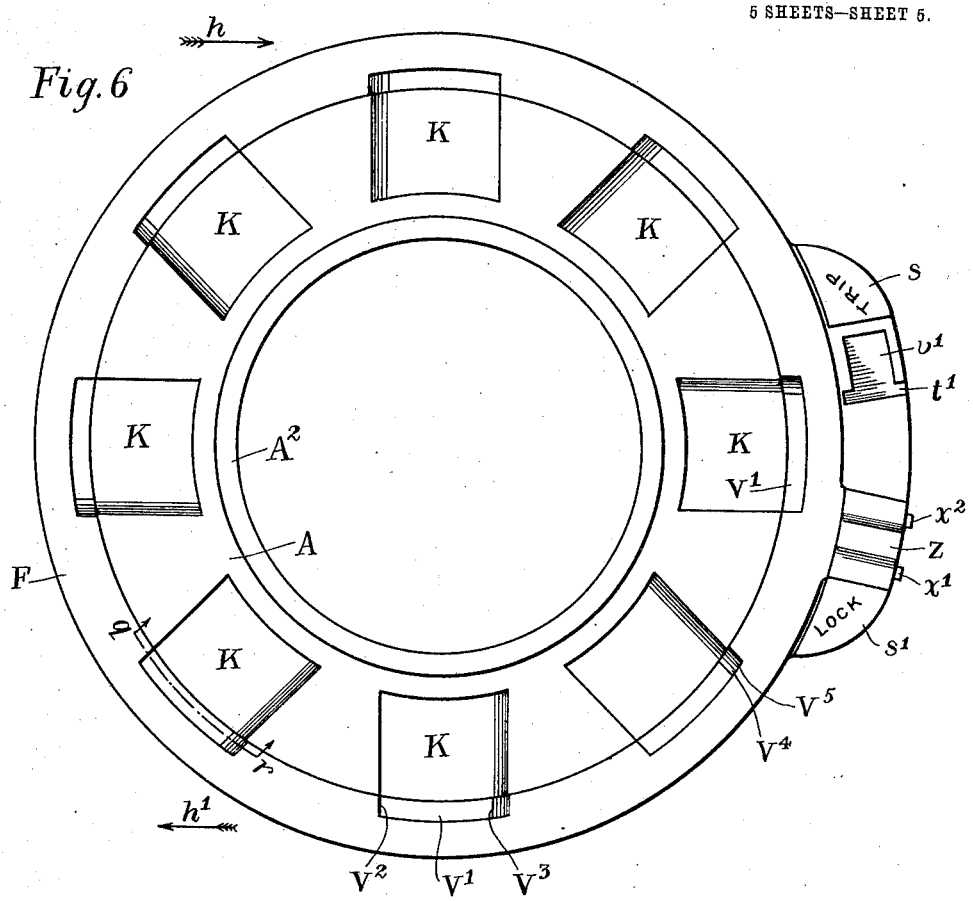
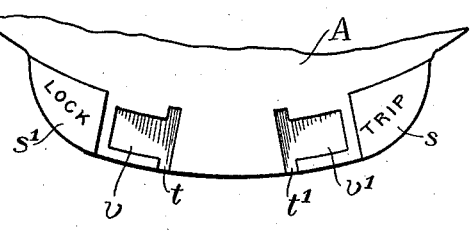
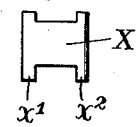
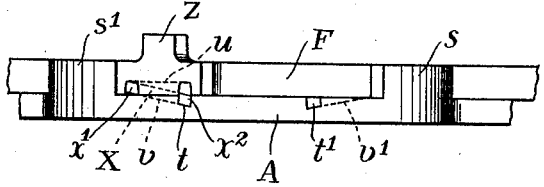
WITNESSES:
David J. Halsh
Louis Huck.
INVENTOR
Cipriano Andrade Jr.

UNITED STATES PATENT OFFICE.

CIPRIANO ANDRADE, JR., OF NEW YORK, N. Y.

PAWL-AND-RATCHET MECHANISM.

1,016,537.     Specification of Letters Patent.     Patented Feb. 6, 1912.

Original application filed May 4, 1910, Serial No. 559,384. Divided and this application filed June 23, 1910.
Serial No. 568,582.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Pawl-and-Ratchet Mechanism, of which the following is a specification.

My said invention has been heretofore shown, described and claimed by me in my pending applications for patent on windlasses, filed and serially numbered respectively as follows: to wit February 14, 1910, 543,828, February 21, 1910, 545,058, May 4, 1910, 559,384, May 14, 1910, 561,363; but as the Patent Office has heretofore required division of the claims made in the three first named applications, I file this present application as a divisional application growing out of said windlass application Serial Number 559,384, of May 4, 1910, said application including within itself, all the features of the others, for which claims are herein made.

The general objects and purposes and method of operation of the pawl and ratchet mechanism hereinafter claimed are fully set forth in said four above named applications, and reference is herein made to said four applications to elucidate and explain the general functioning of the devices of which my improved pawl and ratchet forms a part.

Figure 2:
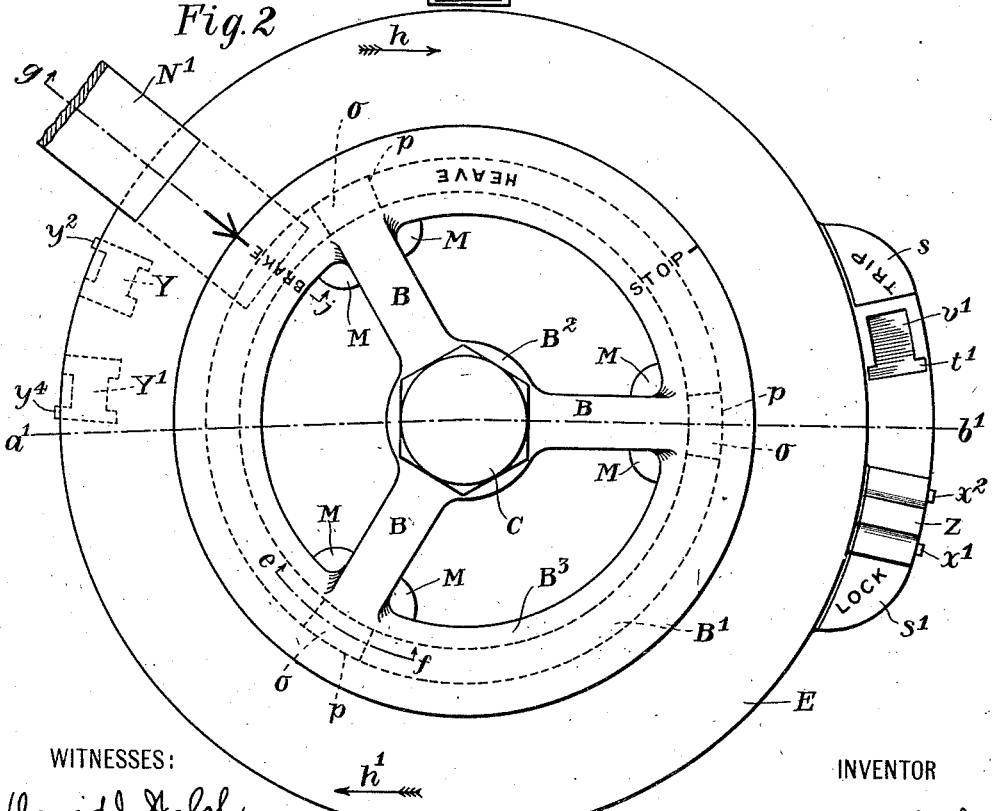
Figure 5:
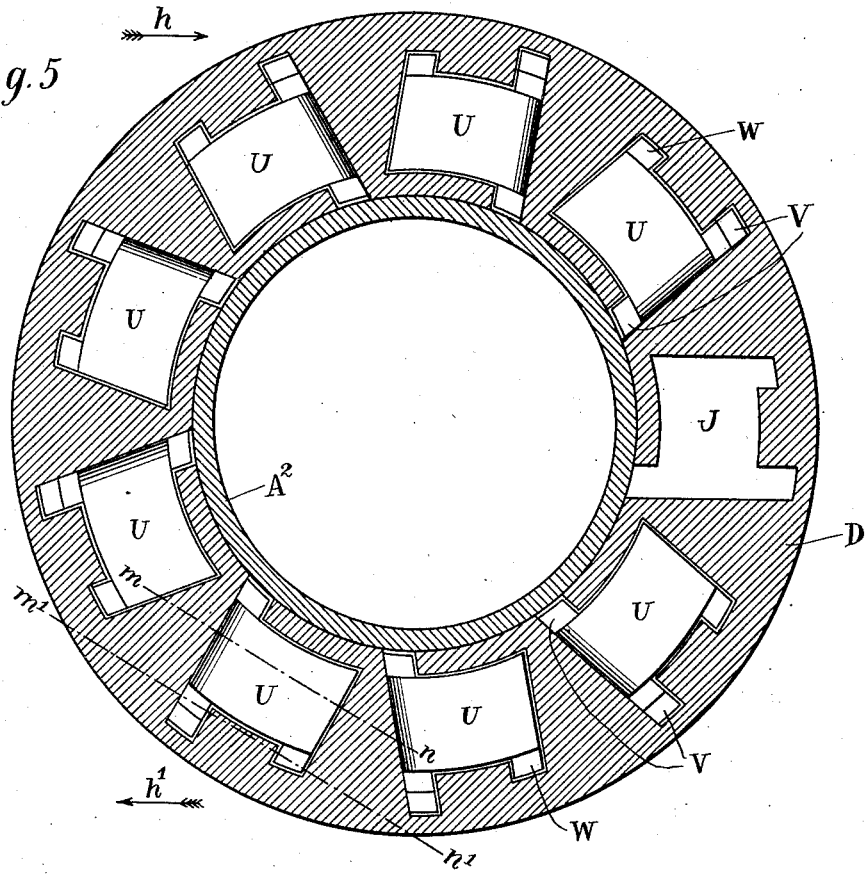
Figure 15:
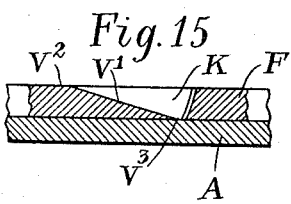
Figure 16:
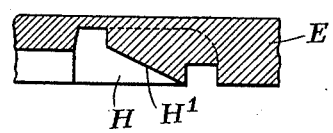
Figure 17:
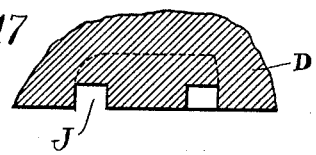

The present divisional application relates to improvements in pawl and ratchet mechanism; and the objects of my invention are; first to provide a form of pawl which shall be mechanically correct and operative for the styles of windlass set forth in the above mentioned pending applications and similar structures; second to provide a form of pawl which will permit of being tripped, when used in such windlasses or in other similar structures. I attain these objects by the mechanism illustrated in the accompanying drawings, in which:

Figure 1 is a section in elevation of my device taken on the line $a'$—$b'$ (Fig. 2). Fig. 2 is a plan view of the top of my device. Fig. 3 is a horizontal section of my device taken on the line $a$—$b$ (Fig. 1). Fig. 4 is a plan view on the level of the top of the sheave. Fig. 5 is a horizontal section of my device taken on the line $c$—$d$ (Fig. 1). Fig. 6 is a plan view of the bed plate. Fig. 7 is a detail elevation of the locking device for the upper trip ring. Fig. 8 is a section elevation looking toward the center of the windlass taken on the line $e$—$f$ (Fig. 2). Fig. 9 is a section elevation taken on line $g$—$j$ (Fig. 2). Fig. 10 is a plan view of the locking device for the upper trip ring. Fig. 11 is a section elevation, looking toward the center of the windlass, in plane $k$—$l$ (Fig. 3) showing an upper pawl in relief. Fig. 12 is an end view of an upper pawl. Fig. 13 is a section elevation, looking toward the center of the windlass, in plane $m$—$n$ (Fig. 5) showing a lower pawl in relief. Fig. 14 is an end view of a lower pawl. Fig. 15 is a section elevation, looking toward the center of the windlass, in plane $q$—$r$ (Fig. 6). Fig. 16 is a section elevation, looking toward the center of the windlass, in plane $k'$—$l'$ (Fig. 3), the pawl being removed. Fig. 17 is a section elevation, looking toward the center of the windlass, in plane $m'$—$n'$ (Fig. 5). Fig. 18 is a detail plan view of a portion of the bedplate showing a locking device for the lower trip ring. Fig. 19 is a detail elevation of the locking device for the lower trip ring. Fig. 20 is a detail view of the locking pawl for lower trip ring.

Similar letters refer to similar parts throughout the several views.

In order properly to understand the function of the pawl and ratchet device, a general statement of the operation of the windlass as a whole is necessary.

A is a bed plate.

A′ are lugs on the bottom of bed plate A. These lugs A′ are countersunk into the deck or floor and prevent the bed plate from moving.

$A^2$ is a central hollow pin integral with bed plate A.

B is a spider, comprising a central ring $B^2$, three arms B, and an upper ring $B^3$.

B′ is a circular groove in the lower face of ring $B^3$.

C is a central bolt which passes through the hole in the central ring $B^2$.

L is a nut threaded to the lower end of bolt C.

C′ is a section of chain in place on the periphery of the windlass.

D is a sheave rotating about $A^2$ as an axis.

E is a top plate rotating about the upper portion of $A^2$ as an axis.

E′ is a circular shallow clearance groove in the top of top plate E, registering with groove B′.

F is the lower trip ring.

G is the upper trip ring.

H are recesses in top plate E, made to receive upper pawls O.

H′ are inclined faces in top plate E over the path of travel of wedge surfaces P.

I are recesses in the top of sheave D to engage the free ends of pawls O.

J are recesses in sheave D to receive lower pawls U.

K are recesses in bed plate A to engage the free ends of pawls U.

$o$ are wedge surfaces dependent from the upper face of groove B′ and integral with ring $B^3$.

$p$ are wedge surfaces located in groove E′ and integral with top plate E.

M are lugs integral with hollow pin $A^2$, their function being to hold the spider arms B is place.

N′ is a removable handle bar in position in socket N in top plate E.

Y is a lock pawl to lock trip ring G in position.

$y'$ is a trunnion on lock pawl Y.

$y^2$ is a trip lug on lock pawl Y.

Y′ is another lock pawl to lock trip ring G in position.

$y^3$ is a trunnion on lock pawl Y′.

$y^4$ is a trip lug on lock pawl Y′.

$s$ is a stop lug integral with bed plate A.

$s'$ is another stop lug integral with bed plate A.

Z is a handle integral with trip ring F.

$v$ and $v'$ are recesses in bed plate A.

$t$ is a slot extending from recess $v'$.

$t'$ is a slot extending from recess $v'$.

X is a locking pawl to lock handle Z in position.

$x'$ and $x^2$ are lugs projecting from pawl X.

O are upper pawls.

P are wedge surfaces integral with trip ring G.

Q are lugs integral with wedge surfaces P and trip ring G. Wedge surfaces P have their upper edge level with the top of lug Q and trip ring G. Wedge surfaces P have their lower edge next to lugs T (Fig. 3).

S are trunnions on pawls O.

T are trip lugs at the following end of pawls O.

$w$ is a locking recess on top of trip ring G, with grooves $w'$ and $w^2$.

V are trunnions on pawls U.

It will be observed that the outer trunnion V is materially longer than the trip lug W. This is to insure that the leading outer corner of pawl U shall not fall into recess K, but shall at all times ride evenly over bed plate A, the outer end of trunnion V being always supported by the upper face of trip ring F, outside the line of wedge surfaces V′; while at the same time, trip lug W (owing to its shorter length) is free to fall into recess K, and into wedge space $V^2$ V′ $V^3$ (Fig. 6).

W are trip lugs on pawls U.

V′ are wedge surfaces integral with trip ring F.

$V^2$ are the upper edges of wedge surfaces V′, which are flush with the top of trip ring F.

$V^3$ are the lower edges of wedge surfaces V′, which are flush with the bottom of trip ring F. $V^3$ is also flush with the lower edge of recesses K.

$V^4$ are open spaces in the bottom of trip ring F.

$V^5$ are inclined surfaces in trip ring F, running parallel with the adjoining surfaces in recesses K. In the locking position of trip ring F, surfaces $V^5$ should be back about $\frac{1}{32}$ of an inch or thereabout from the adjoining surface in recess K, in order to keep the thrust of pawls U entirely on bed plate A, and not to have any portion of that thrust on trip ring F.

$u$ is a recess in the lower face of handle Z. Recess $u$ is so shaped as to fit around lock pawl X.

$z$ are whelps on the periphery of sheave D.

The operation of my device is as follows: The upper trip ring is set in the "lock" position (Fig. 7), and the lower trip ring is set in the "lock" position (Fig. 19). A chain is led from the direction $h$ (Fig. 2) around the edge of sheave D, and away in the direction $h'$; the links of the chain being placed between whelps $z$. By reference to Fig. 2 it will be observed that the word "Brake" appears on top of ring $B^3$, and the arrow on top of top plate E points to this word "Brake" on ring $B^3$. By means of handle bar N′, top plate E is made to rotate say about 100 degrees in the direction $h$ (the arrow on top plate E passing by the word "Heave" shown on top of ring $B^3$) until the arrow on top plate E nearly reaches the word "Stop" on ring $B^3$; during this operation one of the pawls O, engaging in one of the recesses I, carries the sheave D in the same direction as top plate E, and a length of chain is thus drawn in from the direction $h$ and discharged in the direction $h'$. A light tension is, of course, to be maintained on the chain when it leaves D in the direction $h'$. This tension may be by hand pull, or by leading the chain down a pipe through the deck of the vessel as is commonly the practice with anchor chains, etc., in which case the weight of the chain going down through the pipe keeps the proper tension on the chain. At the end of the 100 degrees of rotation just mentioned, the handle bar N' carrying with it top plate E is rotated backward against the direction $h$ say 90 degrees to a point near the original starting point (marked "Brake"). During the backward motion of top plate E, the sheave D is held motionless by one of the pawls U engaging in one of the recesses K in bed plate A; at the same time the pawls O in top plate E slide back over recesses I in the top of sheave D. Thus by successive reciprocating movements of handle bar N', sheave D is rotated steadily in the direction $h$ $h'$, and any desired length of chain may be drawn in from the direction $h$ and discharged in the direction $h'$. And whenever handle bar N' is withdrawn from socket N, the sheave D (and with it the chain) is held fast by a pawl U engaging in a recess K. Suppose now, that it is desired to hold the chain fast. We turn top plate E back against the direction $h$ until it assumes the position shown in Fig. 2, at which point the lower face of wedge surfaces $o$ comes in contact with the upper face of wedge surfaces $p$, thus jamming top plate E down on sheave D. In this position, sheave D is held fast by the friction of its upper and lower faces against top plate E and bed plate A. As sheave D is held fast, so, of course, is the chain. While sheave D is thus held by friction between top plate E and bed plate A, it should be noted that trip rings F and G should not be jammed, but should be free to rotate so far as any pressure exerted by top plate E is concerned. This is accomplished by suitable machining of the trip rings F and G and the adjoining parts of the device. Suppose now, that it is desired to pay out the chain. Top plate E is left jammed down against sheave D; and the next operation is to trip both the upper and the lower set of pawls. This is accomplished as follows: To trip the upper pawls—lift the lug $y^2$ on lock pawl Y (Figs. 2 and 7) and rotate trip ring G to the right until the arrow on top plate E (Fig. 7) points to the line over the word "Trip" engraved on trip ring G (Fig. 7). At this point the lug $y^4$ on lock pawl Y' will fall into groove $w^2$, thus locking trip ring G, and preventing trip ring G from rotating back to the left. Also in this position, further motion of trip ring G to the right is prevented by contact of the upper surface of wedge surfaces P with the lower surface of wedge surfaces H', (Fig. 16). While trip ring G has been rotating from left to right wedge surfaces P (Fig. 3) have been entering under trip lugs T, and by the time that trip ring G has reached the full tripping position, trip lugs T are resting on top of lugs Q (Fig. 3). By this means, all the pawls O in top plate E are securely and permanently tripped. Instead of leaving top plate E stationary, and moving trip ring G, the upper pawls may be tripped by holding trip ring G rigid, so that it remains motionless with reference to bed plate A; and while trip ring G is thus held rigid and motionless, top plate E carrying with it the pawls O, may be moved in the direction $h$ (Figs. 2 and 3). The relative motion thus effected between trip lugs T and wedge surfaces P will cause pawls O to trip. When tripping in this manner, the handle bar N' will preferably be inserted in handle bar socket N, the operation of tripping thus being effected directly by motion of the handle bar itself. To trip the lower pawls: lift lug $x^2$ on lock pawl X out of groove $t$ (Fig. 19). Push handle Z to the right until it comes in contact with lug $s$. In this position, lug $x'$ falls into groove $t'$, thus locking trip ring F securely in position. While handle Z on trip ring F has been rotating from the left to the right, the wedge surfaces V' have been lifting trip lugs W on pawls U. And when handle Z is locked in position next to lug $s$, the wedge surfaces V' in trip ring F all register with the flat surfaces on top of bed plate A between recesses K (Fig. 6). By this means, all the pawls U in sheave D are securely and permanently tripped. Sheave D is now held merely by friction caused by the pressure of top plate E, and in order to pay out the chain, all that is necessary is to relieve the pressure of top plate E by moving handle N' in the direction $h$ $h'$. This causes top plate E also to rotate in the direction $h$ $h'$, and thus to take the wedge surfaces $o$ and $p$ out of engagement, and to lessen the friction on sheave D, whereupon sheave D is free to rotate, and the chain pays out. The outward movement of the chain can be controlled, checked or completely stopped, by decreasing or increasing the friction between top plate E and sheave D, by moving or pressing handle bar N' in one direction or the other.

It will be noted that if the windlass is to be simply a "one way" windlass, without means for paying out the chain, the pawls do not require the trip lugs T and W, neither are the trip rings F and G required.

My invention over the prior art consists in several particulars. First, in making the pawls with their leading and following faces substantially parallel in plan. The object of this is to avoid any outward radial thrust component, which would be inevitably exerted by the pawls, if their leading and following faces were radial in plan (as for example in my application Serial No. 543,828). Second; in making the pawls with the lower face flat at the ends, thereby materially decreasing wear. Third; in making the pawls with the lower face hollow in its middle portion, thus permitting the pawl to ride up gradually out of its recess, instead of "flipping" up, as would be the case if the entire lower face were flat. Fourth; in making the pawls with integral trunnions at the leading end instead of pins. This insures greater strength and simplicity of construction. Fifth: in making the pawl deeper than the recess into which it falls, thereby permitting the upper member, in which the pawl is incased, to push the pawl forward. If the pawl were shallower than the recess into which it falls, the upper member on being rotated would ride up on the wedge-like top face of the pawl and jam. Sixth: in the trip lugs and trip rings and the various combinations thereof and the locking devices thereon shown and claimed.

I claim:

1. In windlasses, a horizontal pawl having a trunnion, the lower surface of the trunnion being flat, the axis of said pawl being substantially parallel to a line radial to the axis of rotation of the windlass sheave.

2. In windlasses, a horizontal pawl having a trunnion, the lower surface of said trunnion being flat, and the upper surface and sides of said trunnion being rounded, the axis of said pawl being substantially parallel to a line radial to the axis of rotation of the windlass sheave.

3. In windlasses, a pawl having, in combination, trunnions at its leading end, and a trip lug; the trunnion on the side of the trip lug being materially longer than the trip lug.

4. In windlasses, a pawl having, in combination, trunnions at its leading end, and a trip lug near its following end; the trunnion on the side of the trip lug being materially longer than the trip lug.

5. In windlasses, a pawl having, in combination, trunnions at its leading end, and a trip lug at its following end; the trunnion on the side of the trip lug being materially longer than the trip lug.

6. In windlasses, a pawl whose leading and following edges are both substantially parallel in plan to a line radial to the axis of rotation of the windlass sheave; said pawl having a trip lug; each end of the lower face of said pawl being a plane surface in substantially the same plane, the middle portion of said lower face being curved upward, said pawl having trunnions at its leading end.

7. In windlasses, a pawl whose leading and following edges are both substantially parallel in plan to a reference line, said reference line lying between the leading and following edges of the pawl and being radial to the axis of rotation of the windlass sheave, said pawl having a trip lug; each end of the lower face of said pawl being a plane surface in substantially the same plane, the middle portion of said lower face being curved upward, said pawl having trunnions at its leading end.

8. In windlasses, in combination, a pawl, a lug projecting from a pawl; and a trip ring, said trip ring having on its side and integral with itself a wedge surface, said wedge surface coöperating with said lug on said pawl, to trip said pawl; the axis of the pawl being parallel to a line radial to the axis of rotation of the windlass sheave.

9. In windlasses, in combination; a pawl; a trip lug integral with said pawl; a ring substantially concentric with the path of travel of said pawl, said ring having integral with itself a wedge surface, adapted for engagement with said lug, said ring being rotatable with said pawl; and means for rotating said ring to a limited extent relatively to said pawl, whereby said wedge surface is brought into effective engagement with said lug to lift said lug and trip said pawl, the axis of the pawl being parallel to a line radial to the axis of rotation of the windlass sheave.

10. In windlasses, in combination; a pawl; a trip lug integral with said pawl; a ring substantially concentric with the path of travel of said pawl, said ring having integral with itself a wedge surface, adapted for engagement with said lug, said ring being rotatable with said pawl; means for rotating said ring to a limited extent relatively to said pawl, whereby said wedge surface is wrought into effective engagement with said lug to lift said lug and trip said pawl; and means for holding said ring in a position to trip the pawl; the axis of the pawl being parallel to a line radial to the axis of rotation of the windlass sheave.

11. In windlasses, in combination; a pawl; a trip lug integral with said pawl; a ring substantially concentric with the path of travel of said pawl, said ring having integral with itself a wedge surface, adapted for engagement with said lug, said ring being rotatable with said pawl; means for rotating said ring to a limited extent relatively to said pawl, whereby said wedge surface is brought into effective engagement with said lug to lift said lug and trip said pawl; and means for holding said ring in a position permitting the pawl to lock; the axis of the pawl being parallel to a line radial to the axis of rotation of the windlass sheave.

12. In windlasses, in combination; a pawl; a trip lug integral with said pawl; a ring substantially concentric with the path of travel of said pawl, said ring having integral with itself a wedge surface, adapted for engagement with said lug, said ring being rotatable with said pawl; means for rotating said ring to a limited extent relatively to said pawl, whereby said wedge surface is brought into effective engagement with said lug to lift said lug and trip said pawl; means for holding said ring in a position to trip the pawl; and means for holding said ring in a position permitting the pawl to lock; the axis of the pawl being parallel to a line radial to the axis of rotation of the windlass sheave.

13. In windlasses, in combination; a plurality of pawls; a trip lug integral with each of said pawls; a ring substantially concentric with the common path of travel of said pawls, said ring having integral with itself a plurality of wedge surfaces, each of said wedge surfaces registering in position with one of said lugs, each of said wedge surfaces being adapted for engagement with its corresponding lug, said ring being rotatable with said pawls; and means for rotating said ring to a limited extent relatively to said pawls, whereby said wedge surfaces are brought into effective engagement with said lugs, to lift said lugs and trip said pawls; the axis of the pawls being parallel to a line radial to the axis of rotation of the windlass sheave.

14. In windlasses, in combination; a plurality of pawls; a trip lug integral with each of said pawls; a ring substantially concentric with the common path of travel of said pawls; said ring having integral with itself a plurality of wedge surfaces, each of said wedge surfaces registering in position with one of said lugs, each of said wedge surfaces being adapted for engagement with its corresponding lug, said ring being rotatable with said pawls; means for rotating said ring to a limited extent relatively to said pawls, whereby said wedge surfaces are brought into effective engagement with said lugs, to lift said lugs and trip said pawls; and means for holding said ring in a position to trip the pawls; the axis of the pawl being parallel to a line radial to the axis of rotation of the windlass sheave.

15. In windlasses, in combination; a plurality of pawls; a trip lug integral with each of said pawls; a ring substantially concentric with the common path of travel of said pawls, said ring having integral with itself a plurality of wedge surfaces, each of said wedge surfaces registering in position with one of said lugs, each of said wedge surfaces being adapted for engagement with its corresponding lug, said ring being rotatable with said pawls; means for rotating said ring to a limited extent relatively to said pawls, whereby said wedge surfaces are brought into effective engagement with said lugs, to lift said lugs and trip said pawls; and means for holding said ring in a position permitting the pawls to lock; the axis of the pawl being parallel to a line radial to the axis of rotation of the windlass sheave.

16. In windlasses, in combination; a plurality of pawls; a trip lug integral with each of said pawls; a ring substantially concentric with the common path of travel of said pawls, said ring having integral with itself a plurality of wedge surfaces, each of said wedge surfaces registering in position with one of said lugs, each of said wedge surfaces being adapted for engagement with its corresponding lug, said ring being rotatable with said pawls; means for rotating said ring to a limited extent relatively to said pawls, whereby said wedge surfaces are brought into effective engagement with said lugs, to lift said lugs and trip said pawls; means for holding said ring in a position to trip the pawls; and means for holding said ring in a position permitting the pawls to lock; the axis of the pawls being parallel to a line radial to the axis of rotation of the windlass sheave.

17. In windlasses; in combination; a pawl; a member having a pawl recess registering with the path of travel of said pawl, whereby said member may move freely in one direction with reference to said pawl but not in the opposite direction; a trip lug integral with said pawl; a ring substantially concentric with the path of travel of said pawl, said ring having integral with itself a wedge surface, adapted for engagement with said lug, said ring being normally stationary with reference to said pawl recess; means for rotating said ring to a limited extent relatively to said recess, whereby said wedge surface is brought into effective engagement with said lug, to lift said lug and trip said pawl.

18. In windlasses, in combination; a pawl; a member having a pawl recess registering with the path of travel of said pawl, whereby said member may move freely in one direction with reference to said pawl but not in the opposite direction; a trip lug integral with said pawl; a ring substantially concentric with the path of travel of said pawl, said ring having integral with itself a wedge surface, adapted for engagement with said lug, said ring being normally stationary with reference to said pawl recess; means for rotating said ring to a limited extent relatively to said recess, whereby said wedge surface is brought into effective engagement with said lug, to lift said lug and trip said pawl; and means for holding said ring in a position to trip the pawl.

19. In windlasses; in combination; a pawl; a member having a pawl recess registering with the path of travel of said pawl, whereby said member may move freely in one direction with reference to said pawl but not in the opposite direction; a trip lug integral with said pawl; a ring substantially concentric with the path of travel of said pawl, said ring having integral with itself a wedge surface, adapted for engagement with said lug, said ring being normally stationary with reference to said pawl recess; means for rotating said ring to a limited extent relatively to said recess, whereby said wedge surface is brought into effective engagement with said lug, to lift said lug and trip said pawl; and means for holding said ring in a position permitting the pawl to lock.

20. In windlasses; in combination; a pawl; a member having a pawl recess registering with the path of travel of said pawl, whereby said member may move freely in one direction with reference to said pawl but not in the opposite direction; a trip lug integral with said pawl; a ring substantially concentric with the path of travel of said pawl, said ring having integral with itself a wedge surface, adapted for engagement with said lug, said ring being normally stationary with reference to said pawl recess; means for rotating said ring to a limited extent relatively to said recess, whereby said wedge surface is brought into effective engagement with said lug, to lift said lug and trip said pawl; means for holding said ring in a position to trip the pawl; and means for holding said ring in a position permitting the pawl to lock.

21. In windlasses, in combination, a plurality of pawls; a member having a plurality of pawl recesses registering with the common path of travel of said pawls, whereby said member may move freely in one direction with reference to said pawls but not in the opposite direction; a trip lug integral with each of said pawls; a ring substantially concentric with the common path of travel of said pawls, said ring having integral with itself a plurality of wedge surfaces, each of said wedge surfaces registering in position with one of said recesses, each of said wedge surfaces being adapted for engagement with all of said lugs, said ring being normally stationary with reference to said pawl recesses; and means for rotating said ring to a limited extent relatively to said recesses, whereby said wedge surfaces are brought into effective engagement with said lugs, to lift said lugs and trip said pawls.

22. In windlasses, in combination, a plurality of pawls; a member having a plurality of pawl recesses registering with the common path of travel of said pawls, whereby said member may move freely in one direction with reference to said pawls but not in the opposite direction; a trip lug integral with each of said pawls; a ring substantially concentric with the common path of travel of said pawls, said ring having integral with itself a plurality of wedge surfaces, each of said wedge surfaces registering in position with one of said recesses, each of said wedge surfaces being adapted for engagement with any one of said lugs, said ring being normally stationary with reference to said pawl recesses; means for rotating said ring to a limited extent relatively to said recesses, whereby said wedge surfaces are brought into effective engagement with said lugs, to lift said lugs and trip said pawls; and means for holding said ring in a position to trip said pawls.

23. In windlasses, in combination, a plurality of pawls; a member having a plurality of pawl recesses registering with the common path of travel of said pawls, whereby said member may move freely in one direction with reference to said pawls but not in the opposite direction; a trip lug integral with each of said pawls; a ring substantially concentric with the common path of travel of said pawls, said ring having integral with itself a plurality of wedge surfaces, each of said wedge surfaces registering in position with one of said recesses, each of said wedge surfaces being adapted for engagement with any one of said lugs, said ring being normally stationary with reference to said pawl recesses; means for rotating said ring to a limited extent relatively to said recesses, whereby said wedge surfaces are brought into effective engagement with said lugs, to lift said lugs and trip said pawls; and means for holding said ring in a position permitting said pawls to lock.

24. In windlasses, in combination, a plurality of pawls; a member having a plurality of pawl recesses registering with the common path of travel of said pawls, whereby said member may move freely in one direction with reference to said pawls but not in the opposite direction; a trip lug integral with each of said pawls; a ring substantially concentric with the common path of travel of said pawls, said ring having integral with itself a plurality of wedge surfaces, each of said wedge surfaces registering in position with one of said recesses, each of said wedge surfaces being adapted for engagement with any one of said lugs, said ring being normally stationary with reference to said pawl recesses; means for rotating said ring to a limited extent relatively to said recesses, whereby said wedge surfaces are brought into effective engagement with said lugs, to lift said lugs and trip said pawls; means for holding said ring in a position to trip said pawls; and means for holding said ring in a position permitting said pawls to lock.

25. In windlasses, an upper member having a recess; a pawl contained in said recess and closely fitting therein; a lower member having a recess, said recess being adapted for effective engagement with the free end of said pawl; both the pawl and the upper recess being deeper vertically than the lower recess; the axis of the pawl being parallel to a line radial to the axis of rotation of the windlass sheave.

26. In windlasses, a locking device for trip rings comprising a lock pawl with trunnions at each of its ends, said lock pawl being let into the lower face of said trip ring; a flat member below the path of travel of said lock pawl, said member having in its upper face two inclined recesses, one of said inclined recesses registering with said lock pawl at one end of its path of travel, the other of said inclined recesses registering with said lock pawl at the other end of its path of travel, said inclined recesses having their lower portions toward the central point of the path of travel of the lock pawl, said member also having grooves from the lower portion of each of said inclined recesses to the outer face of said member, each of said inclined recesses and grooves being adapted for engagement with one end of said lock pawl.

27. In windlasses, a locking device for trip rings comprising a lock pawl with trunnions at each of its ends, said lock pawl being let into the lower face of said trip ring; a flat member below the path of travel of said lock pawl, said member having in its upper face two inclined recesses, one of said inclined recesses registering with said lock pawl at one end of its path of travel, the other of said inclined recesses registering with said lock pawl at the other end of its path of travel, said inclined recesses having their lower portions toward the central point of the path of travel of the lock pawl, said member also having grooves from the lower portion of each of said inclined recesses to the outer face of said member, each of said inclined recesses and grooves being adapted for engagement with one end of said lock pawl; and outside means for limiting the path of travel of said trip ring.

28. In windlasses, a locking device for trip rings, comprising a trip ring with a recess on its upper face, said recess having grooves at each end thereof, extending to the outer face of the trip ring; a flat member over the path of travel of said recess, said flat member having two lock pawls let into its lower face, one of said lock pawls registering with said recess at one end of the path of travel of the recess, and the other of said lock pawls registering with said recess at the other end of the path of travel of the recess, the body of each of said lock pawls being adapted for engagement in said recess, each of said lock pawls having trunnions at each of its ends, the trunnions on each of said lock pawls next to the center of the path of travel of the recess being wider than the grooves in the trip ring, the trunnions on each of said pawls at the outer end of the path of travel of the recess being adapted for engagement into said grooves.

29. In windlasses, a locking device for trip rings, comprising a trip ring with a recess on its upper face, said recess having grooves at each end thereof, extending to the outer face of the trip ring; a flat member over the path of travel of said recess, said flat member having two lock pawls let into its lower face, one of said lock pawls registering with said recess at one end of the path of travel of the recess, and the other of said lock pawls registering with said recess at the other end of the path of travel of the recess, the body of each of said lock pawls being adapted for engagement in said recess, each of said lock pawls having trunnions at each of its ends, the trunnions on each of said lock pawls next to the center of the path of travel of the recess being wider than the grooves in the trip ring, the trunnions on each of said pawls at the outer end of the path of travel of the recess being adapted for engagement in said grooves; and outside means for limiting the path of travel of said trip ring.

30. In windlasses, a pawl whose leading and following edges are at all times substantially parallel in plan to a line radial to the axis of rotation of the windlass sheave; and an adjoining member having recesses adapted for engagement with the free end of the pawl, whereby the pawl may move in one direction with reference to the adjoining member but not in the opposite direction.

31. In windlasses, a pawl whose leading and following edges are substantially parallel in plan to a line radial to the axis of rotation of the windlass sheave, the path of travel of the pawl being concentric with the axis of rotation of the windlass sheave; and an adjoining member having recesses adapted for engagement with the free end of the pawl, whereby the pawl may move in one direction with reference to the adjoining member but not in the opposite direction.

32. In windlasses, a pawl whose leading and following edges are substantially parallel in plan to a reference line, said reference line lying between the leading and following edges of the pawl and being at all times radial to the axis of rotation of the windlass sheave; and an adjoining member having recesses adapted for engagement with the free end of the pawl, whereby the pawl may move in one direction with reference to the adjoining member but not in the opposite direction.

33. In windlasses, a pawl whose leading and following edges are substantially parallel in plan to a reference line, said reference line lying between the leading and following edges of the pawl and being radial to the axis of rotation of the windlass sheave, the path of travel of the pawl being concentric with the axis of rotation of the windlass sheave; and an adjoining member having recesses adapted for engagement with the free end of the pawl, whereby the pawl may move in one direction with reference to the adjoining member but not in the opposite direction.

34. In windlasses, in combination, a pawl whose leading and following edges are at all times substantially parallel in plan to a line radial to the axis of rotation of the windlass sheave; and an adjoining member having a recess registering in the path of travel of said sheave, the deeper end of said recess being parallel in plan with the following edge of said pawl at the moment of engagement between the pawl and recess; whereby the pawl may move in one direction with reference to the adjoining member but not in the opposite direction.

35. In windlasses, in combination, a pawl whose leading and following edges are substantially parallel in plan to a line radial to the axis of rotation of the windlass sheave; and an adjoining member having a recess registering in the path of travel of said sheave, the deeper end of said recess being parallel in plan with the following edge of said pawl at the moment of engagement between the pawl and recess, the path of travel of the pawl being concentric with the axis of rotation of the windlass sheave; whereby the pawl may move in one direction with reference to the adjoining member but not in the opposite direction.

36. In windlasses, in combination, a pawl whose leading and following edges are substantially parallel in plan to a reference line, said reference line lying between the leading and following edges of the pawl and being at all times radial to the axis of rotation of the windlass sheave; and an adjoining member having a recess, registering in the path of travel of said pawl, the deeper end of said recess being parallel in plan with the following edge of said pawl, at the moment of engagement between the pawl and the recess; whereby the pawl may move in one direction with reference to the adjoining member but not in the opposite direction.

37. In windlasses, in combination, a pawl whose leading and following edges are substantially parallel in plan to a reference line, said reference line lying between the leading and following edges of the pawl and being radial to the axis of rotation of the windlass sheave; and an adjoining member having a recess, registering in the path of travel of said pawl, the deeper end of said recess being parallel in plan with the following edge of said pawl, at the moment of engagement between the pawl and the recess, the path of travel of the pawl being concentric with the axis of rotation of the windlass sheave; whereby the pawl may move in one direction with reference to the adjoining member but not in the opposite direction.

38. In windlasses, a pawl each end of whose lower face is a plane surface in substantially the same plane, the middle portion of said lower face being curved upward, the axis of said pawl being substantially parallel to a line radial to the axis of rotation of the windlass sheave, the path of travel of the pawl being concentric with the axis of rotation of the windlass sheave.

39. In windlasses, a pawl whose leading and following edges are at all times substantially parallel in plan to a line radial to the axis of rotation of the windlass sheave; said pawl having a trip lug; and an adjoining member having recesses adapted for engagement with the free end of the pawl, whereby the pawl may move in one direction with reference to the adjoining member but not in the opposite direction.

40. In windlasses, a pawl whose leading and following edges are substantially parallel in plan to a line radial to the axis of rotation of the windlass sheave; said pawl having a trip lug, the path of travel of the pawl being concentric with the axis of rotation of the windlass sheave; and an adjoining member having recesses adapted for engagement with the free end of the pawl, whereby the pawl may move in one direction with reference to the adjoining member but not in the opposite direction.

41. In windlasses, a pawl whose leading and following edges are at all times substantially parallel in plan to a reference line, said reference line lying between the leading and following edges of the pawl and being radial to the axis of rotation of the windlass sheave, said pawl having a trip lug; and an adjoining member having recesses adapted for engagement with the free end of the pawl, whereby the pawl may move in one direction with reference to the adjoining member but not in the opposite direction.

42. In windlasses, a pawl whose leading and following edges are substantially parallel in plan to a reference line, said reference line lying between the leading and following edges of the pawl and being radial to the axis of rotation of the windlass sheave, said pawl having a trip lug, the path of travel of the pawl being concentric with the axis of rotation of the windlass sheave; and an adjoining member having recesses adapted for engagement with the free end of the pawl, whereby the pawl may move in one direction with reference to the adjoining member but not in the opposite direction.

43. In windlasses; in combination; a plurality of pawls; a member having a plurality of pawl recesses adapted for engagement with said pawls, whereby said member may move freely in one direction with reference to said pawls but not in the opposite direction; trip lugs integral with said pawls; a ring substantially concentric with the axis of the windlass sheave, said ring having integral with itself wedge surfaces, adapted for engagement with said lugs; means for rotating said ring to a limited extent relatively to said pawls, whereby said wedge surfaces may be brought into effective engagement with said lugs to lift said lugs and trip said pawls.

44. In windlasses; in combination; a plurality of pawls; a member having a plurality of pawl recesses adapted for engagement with said pawls, whereby said member may move freely in one direction with reference to said pawls but not in the opposite direction; trip lugs integral with said pawls; a third member having integral with itself a plurality of wedge surfaces lying in the path of travel of said trip lugs; means for causing relative rotative motion between said pawls and said wedge surfaces, whereby said trip lugs and said wedge surfaces may be brought into effective engagement, and said pawls may be tripped.

45. In windlasses; in combination; a pawl; a member carrying said pawl and also carrying the handle bar of the windlass; a second member having a plurality of pawl recesses adapted for engagement with said pawl, whereby said second member may move freely in one direction with reference to said pawl but not in the opposite direction; a trip lug integral with said pawl; a third member having integral with itself a wedge surface lying in the path of travel of said trip lug; means for causing relative rotative motion between said pawl and said wedge surface, whereby said trip lug may be brought into effective engagement with said wedge surface, and said pawl may be tripped.

CIPRIANO ANDRADE, Jr.

Witnesses:
 ARTHUR C. JOHNSON,
 ELTON G. CAMPBELL.

---

Copies of this patent may be obtained for five cents each, by addressing the "Commissioner of Patents, Washington, D. C."

It is hereby certified that in Letters Patent No. 1,016,537, granted February 6 1912, upon the application of Cipriano Andrade, jr., of New York, N. Y., for an improvement in "Pawl-and-Ratchet Mechanism," errors appear in the printed specification requiring correction as follows: Page 1, line 82, after the word "detail" insert the word *plan;* page 2, line 41, for the reference letter "$v'$" read $b$; and that the said Letters Patent should be read with these corrections therein that the same may conform to the record of the case in the Patent Office.

Signed and sealed this 5th day of March, A. D., 1912.

[SEAL.]

C. C. BILLINGS,
*Acting Commissioner of Patents.*